United States Patent [19]

Liao

[11] Patent Number: 5,842,305
[45] Date of Patent: Dec. 1, 1998

[54] FLYTRAP FOR DROWNING FLIES THEREIN

[76] Inventor: Bin-Shing Liao, No. 63, Tou-Yuan Rd., Erh-Lin Chen, Chang-Hua Hsien, Taiwan

[21] Appl. No.: 808,011

[22] Filed: Mar. 3, 1997

[51] Int. Cl.$^6$ ................................................. A01M 1/00
[52] U.S. Cl. .............................. 43/122; 43/107; 43/118
[58] Field of Search ............................. 43/107, 118, 122

[56] References Cited

U.S. PATENT DOCUMENTS

| | | | |
|---|---|---|---|
| 140,176 | 6/1873 | Whiting | 43/118 |
| 722,143 | 3/1903 | Raymond | 43/122 |
| 882,306 | 3/1908 | Fredreckson | 43/122 |
| 920,696 | 5/1909 | Turner | 43/118 |
| 951,763 | 3/1910 | Malpurs | 43/122 |
| 958,208 | 5/1910 | Anderson | 43/122 |
| 1,102,642 | 7/1914 | Brown | 43/122 |
| 1,178,076 | 4/1916 | Jefferis | 43/118 |
| 1,496,135 | 6/1924 | Schwiening | 43/118 |
| 1,882,380 | 10/1932 | Braun | 43/107 |
| 1,900,199 | 3/1933 | Pickett | 43/107 |
| 2,478,104 | 8/1949 | Johnson | 43/122 |
| 3,807,081 | 4/1974 | Chapiewsky | 43/118 |
| 4,217,723 | 8/1980 | Hrebec | 43/122 |
| 4,244,135 | 1/1981 | Harwoods | 43/122 |
| 5,231,791 | 8/1993 | Falkson | 43/122 |
| 5,231,792 | 8/1993 | Warner | 43/122 |
| 5,243,781 | 9/1993 | Carter | 43/122 |
| 5,339,563 | 8/1994 | Job | 43/122 |
| 5,392,560 | 2/1995 | Donahue et al. | 43/122 |
| 5,522,171 | 6/1996 | Mandeville | 43/122 |

*Primary Examiner*—Kurt Rowan
*Attorney, Agent, or Firm*—Merchant, Gould, Smith, Edell, Welter & Schmidt

[57] ABSTRACT

A flytrap includes a container, a cap covering the top opening of the container, a support member supporting the container thereon, and a tray for receiving baits therein. The container has a bottom wall formed integrally with an upward projection at a central portion thereof, and a cylindrical surrounding wall so as to define an annular groove in the bottom wall between the projection wall and the surrounding wall. A liquid unit is received in the groove below the upper opening and includes a sterilizing liquid and an edible oil. The support member has a skirt portion fixed to the periphery of the bottom wall of container, and a plurality of vertical legs which have upper ends fixed to the skirt portion and which are placed on a floor. The tray is also placed on the floor under the skirt portion of the support member. The legs are located around the tray. Flies enter the container via the upper opening of the support member, thereby contacting the edible oil and drowning in the sterilizing liquid. Then, the cap can be removed from the container so as to permit the liquid unit to be discharged from the container by inverting the container.

9 Claims, 4 Drawing Sheets

5,842,305

FLYTRAP FOR DROWNING FLIES THEREIN

BACKGROUND OF THE INVENTION

1. Field of the Invention

This invention relates to a flytrap, more particularly to a flytrap which can drown flies therein.

2. Description of the Related Art

Referring to FIG. 1, a conventional flytrap 10 includes a base 11 formed with a plurality of small openings 111, a truncated conical inner shade 12 having an upper end opening 121 and defining an internal space which is communicated with the small openings 111, and an outer shade 13 which encloses the inner shade 12. Although the flytrap 10 can trap flies in the outer shade 13 outside the inner shade 12, it takes a relatively long time before the trapped flies die. Furthermore, the dead flies in the flytrap 10 will pollute the surroundings.

SUMMARY OF THE INVENTION

An object of this invention is to provide an efficient flytrap in which the dead flies are dealt automatically with a sterilizing liquid so as to prevent environmental pollution.

According to this invention, a flytrap includes a container, a cap covering the top opening of the container, a support member supporting the container thereon, and a tray for receiving baits therein. The container has a bottom wall formed integrally with an upward projection at a central portion thereof. A cylindrical surrounding wall has a lower end which is formed integrally on an outer periphery of an upper surface of the bottom wall so as to define an annular groove in the bottom wall between the upward projection and the surrounding wall. A liquid unit is received in the groove below the upper opening and includes a sterilizing liquid and an edible oil which floats on the sterilizing liquid. The support member has a skirt portion fixed to the periphery of the bottom wall of container, and a plurality of vertical legs which have upper ends fixed to the skirt portion and which are placed on a floor. The tray is also placed on the floor under the skirt portion of the support member in such a manner that the legs are located around the tray. Flies enter the container via the upper opening of the support member, thereby contacting the edible oil and drowning in the sterilizing liquid. Then, the cap can be removed from the container so as to permit the liquid unit to be discharged from the container by inverting the container.

BRIEF DESCRIPTION OF THE DRAWINGS

Other features and advantages of this invention will become apparent in the following detailed description of the preferred embodiment of this invention with reference to the accompanying drawings, in which.

DETAILED DESCRIPTION OF THE PREFERRED EMBODIMENT

Figure 1:
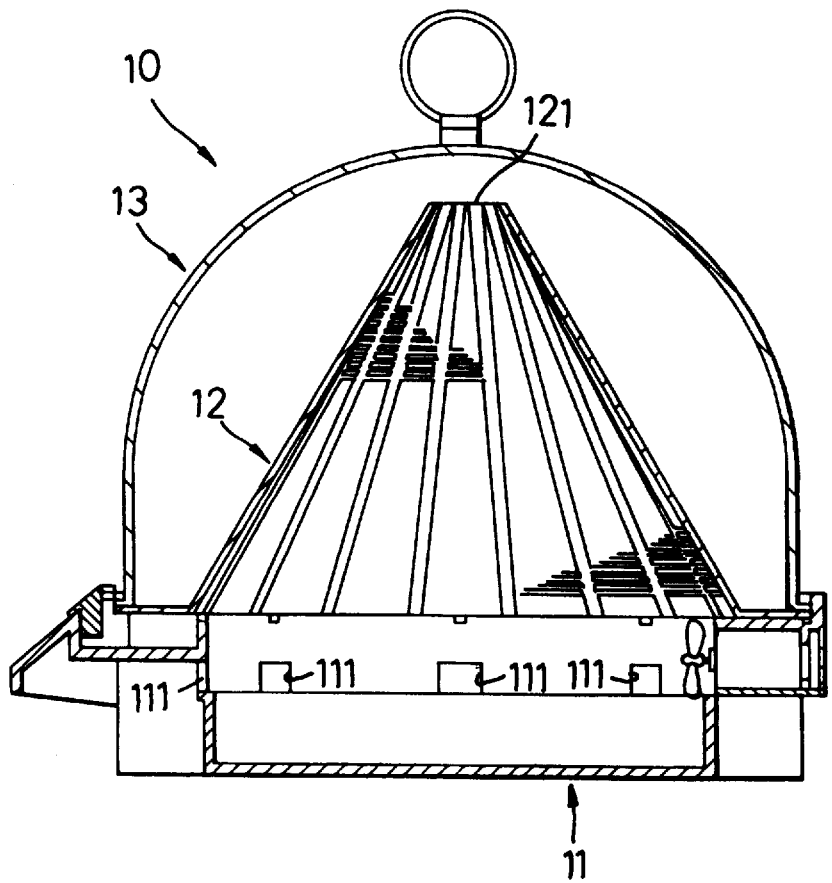
FIG. 1 illustrates a conventional flytrap.
Figure 2:
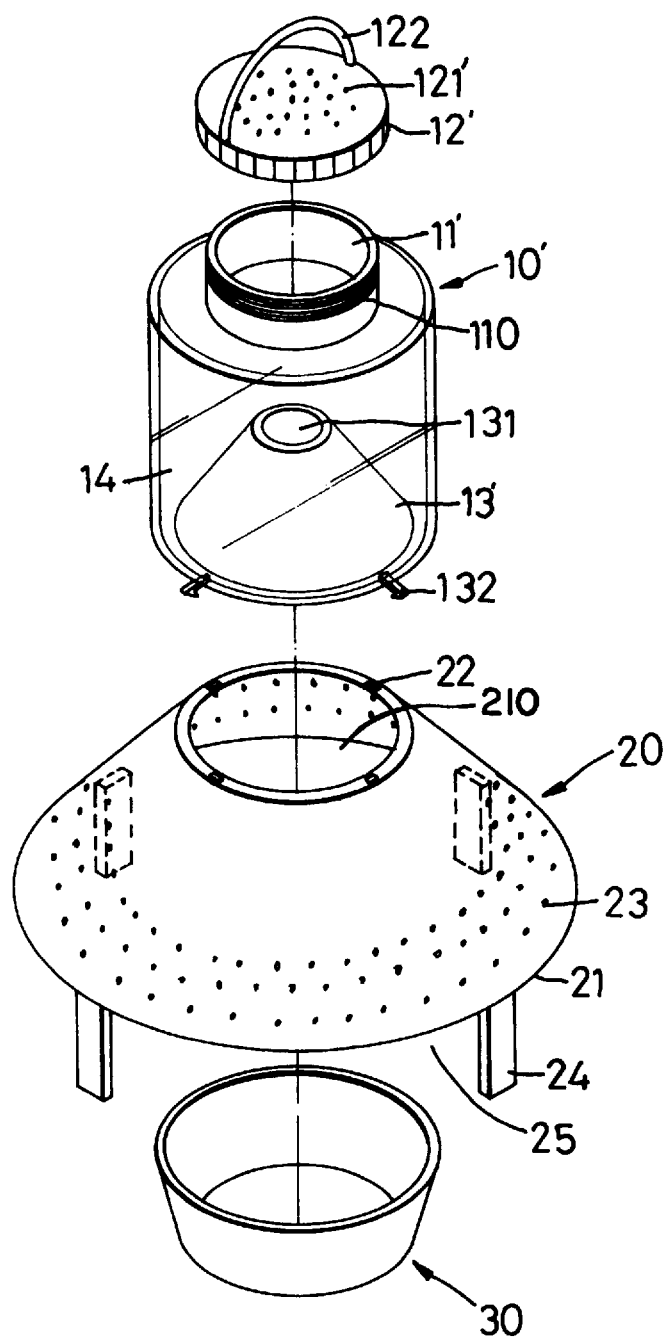
FIG. 2 is an exploded view of a flytrap according to this invention.
Figure 3:
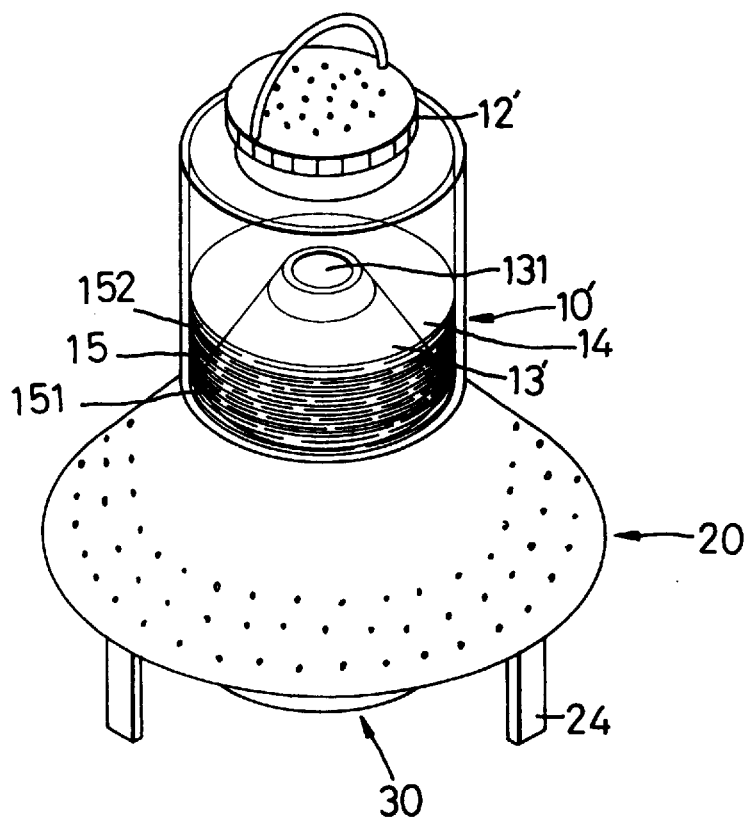
FIG. 3 is a perspective view showing the flytrap of this invention.
Figure 4:
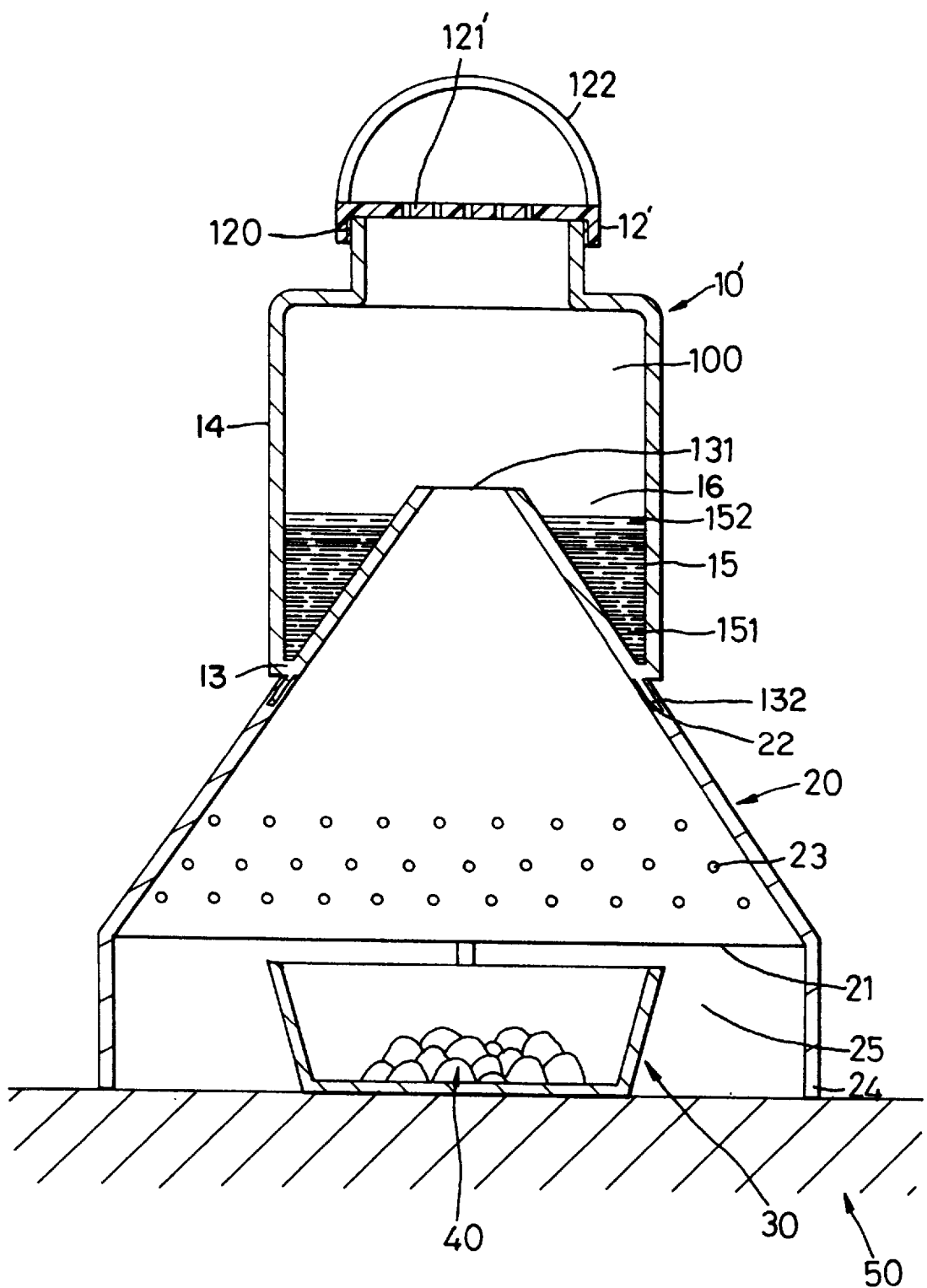
FIG. 4 is a sectional view showing the flytrap of this invention.

Referring to FIGS. 2, 3 and 4, a flytrap of this invention includes a container 10' made of a transparent material and having a top opening 11' formed through a top thereof, a support member 20 made of a translucent material, and a tray 30 which receives baits 40 (see FIG. 4) therein and which is placed on a floor 50 (see FIG. 4).

A cap 12' has an internally threaded section 120 (see FIG. 4) which engages the externally threaded section 110 of the container 11', a plurality of ventilation holes 121' formed through the top wall of the cap 12', and a handle 122 attached to the top wall of the cap 12'.

The container 10' defines a fly-trapping space 100 (see FIG. 4) in communication with the top opening 10' and has a bottom wall 13 (See FIG. 4) and a cylindrical surrounding wall 14. The bottom wall 13 (see FIG. 4) is formed integrally with an upward projection 13' at a central portion thereof. The projection 13' is shaped as a truncated cone that narrows upward and that has an upper opening 131 in communication with the fly-trapping space 100. Four inclined tongues 132 project downwardly and outwardly from the bottom wall. A liquid unit 15 consists of a sterilizing liquid 151 and an edible oil 152 floating on the sterilizing liquid 151, and is received with an annular groove 16 which is formed in the bottom wall 13 of the container 10' between the projection 13' and the surrounding wall 14.

The support member 20 includes a skirt portion 21 which is shaped in the form of a truncated cone that narrows upward and that has an upper end surface formed with four inclined grooves 22, and a plurality of ventilation holes 23 formed through a lower portion of the skirt portion 21. The container 10' is positioned on the support member 20 by engagement of the tongues 132 of the container 10' within the grooves 22 of the skirt portion 21. As illustrated, the diameter of the upper end of the skirt portion 21 of the support member 20 is approximate to that of the lower end of the upward projection 13' of the container 10'. The skirt portion 21 has an upper opening 210 which is communicated with the upper opening 131 of the upward projection 13' of the bottom wall 13 of the container 10'. The support member 20 further includes a plurality of spaced-apart vertical legs 24 which are integrally formed with the lower end portion of the skirt portion 21 and which are placed on the floor 50 (see FIG. 4) around the tray 30. Each adjacent pair of the legs 24 define therebetween an inlet 25 for flies.

As best shown in FIG. 4, the lower end of the skirt portion 21 of the support member 20 is located at a level slightly over the upper end of the tray 30 so that flies can easily fly into the tray 30.

Flies are induced to enter the container 10' due to the fact that the container 10' is made of a transparent material, while the support member 20 is made of a translucent material.

The flavor of the baits 40 can spread around the flytrap via the ventilation holes 23 in the skirt portion 21 of the support member 20.

Because the baits 40 are received within the tray 30, flies enter the container 10' via the support member 20, thereby contacting the edible oil 152 and drowning in the sterilizing liquid 151 to prevent environmental pollution. In use, the cap 12' can be removed from the container 10' so as to discharge the sterilizing liquid 151 and the edible oil 152 from the container 10' by inverting the container 10'.

With this invention thus explained, it is apparent that numerous modifications and variations can be made without departing from the scope and spirit of this invention. It is therefore intended that this invention be limited only as indicated in the appended claims.

I claim:

1. A flytrap comprising:
   a container defining a fly-trapping space therein and having a top opening formed through a top of said container, a bottom wall formed integrally with an upward projection at a central portion thereof, a cylindrical surrounding wall having a lower end which is formed integrally on an outer periphery of an upper surface of said bottom wall so as to define an annular groove in said bottom wall between said upward projection and said surrounding wall, and a liquid unit which is received in said annular groove and which includes a sterilizing liquid and an edible oil that floats on said sterilizing liquid, said bottom wall having an upper opening which is formed in an upper end portion of said upward projection above said liquid unit and which is communicated with said fly-trapping space;

a cap mounted detachably on said container so as to cover said top opening of said container;

a support member having a skirt portion and a plurality of spaced-apart vertical legs, said skirt portion being connected securely to a periphery of said bottom wall of said container at an upper end portion thereof and to upper ends of said legs at a lower end portion of said skirt portion so as to support said container on said support member, said skirt portion having an upper opening which is communicated with said upper opening of said upward projection of said bottom wall of said container, said legs being adapted to be placed on a floor in such a manner that said skirt portion is spaced apart from the floor at a predetermined distance; and a tray adapted to be placed on the floor under said skirt portion of said support member in such a manner that said legs are located around said tray, said tray being adapted to receive baits therein;

wherein each of said upward projection of said container and said skirt portion of said support member is shaped as a truncated cone which narrows upward, a lower end of said upward projection of said container having a diameter approximate to that of an upper end of said skirt portion of said support member;

whereby, when the baits are placed within the tray, flies enter said container via said support member, thereby causing the flies to contact said edible oil and drown in said sterilizing liquid, after which said liquid unit and the flies drowned in said sterilizing liquid can be discharged from said top opening of said container, upon removal of said cap from said container, by inverting said container.

2. A flytrap as claimed in claim 1, wherein said container is made of a transparent material, while said support member is made of a translucent material, while said support member is made of translucent material so as to induce the flies to enter said container via said support member.

3. A flytrap as claimed in claim 1, wherein a lower end of said skirt portion of said support member is located at a level slightly over an upper end of said tray so that the flies can easily fly into said tray.

4. A flytrap comprising:

a container defining a fly-trapping space therein and having a top opening formed through a top of said container, a bottom wall formed integrally with an upward projection at a central portion thereof, a cylindrical surrounding wall having a lower end which is formed integrally on an outer periphery of an upper surface of said bottom wall so as to define an annular groove in said bottom wall between said upward projection and said surrounding wall, and a liquid unit which is received in said annular groove and which includes a sterilizing liquid and an edible oil that floats on said sterilizing liquid, said bottom wall having an upper opening which is formed in an upper end portion of said upward projection above said liquid unit and which is communicated with said fly-trapping space;

a cap mounted detachably on said container so as to cover said top opening of said container;

a support member having a skirt portion and a plurality of spaced-apart vertical legs, said skirt portion being connected securely to a periphery of said bottom wall of said container at an upper end portion thereof and to upper ends of said legs at a lower end portion of said skirt portion so as to support said container on said support member, said skirt portion having an upper opening which is communicated with said upper opening of said upward projection of said bottom wall of said container, said legs being adapted to be placed on a floor in such a manner that said skirt portion is spaced apart from the floor at a predetermined distance; and a tray adapted to be place don the floor under said skirt portion of said support member in such a manner that said legs are located around said tray, said tray being adapted to receive baits therein;

wherein said bottom wall of said container includes a plurality of inclined tongues projecting downwardly and outwardly therefrom, said skirt portion of said support member having a plurality of inclined grooves which are formed in an upper end surface thereof and which respectively engage said tongues of said container so as to position said container on said support member;

whereby, when the baits are placed within the tray, flies enter said container via said support member, thereby causing the flies to contact said edible oil and drown in said sterilizing liquid, after which said liquid unit and the flies drowned in said sterilizing liquid can be discharged from said top opening of said container, upon removal of said cap from said container, by inverting said container.

5. A flytrap as claimed in claim 4, wherein said container is made of a transparent material, while said support member is made of a translucent material so as to induce the flies to enter said container via said support member.

6. A flytrap as claimed in claim 4, wherein a lower end of said skirt portion of said support member is located at a level slightly over an upper end of said tray so that the flies can easily fly into said tray.

7. A flytrap comprising:

a container defining a fly-trapping space therein and having a top opening formed through a top of said container, a bottom wall formed integrally with an upward projection at a central portion thereof, a cylindrical surrounding wall having a lower end which is formed integrally on an outer periphery of an upper surface of said bottom wall so as to define an annular groove is said bottom wall between said upward projection and said surrounding wall, and a liquid unit which is received in said annular groove and which includes a sterilizing liquid and an edible oil that floats on said sterilizing liquid said bottom wall having an upper opening which is formed in an upper end portion of said upward projection above said liquid unit and which is communicated with said fly-trapping space;

a cap mounted detachably on said container so as to cover said top opening of said container;

a support member having a skirt portion and a plurality of spaced-apart vertical legs, said skirt portion being connected securely to a periphery of said bottom wall of said container at an upper end portion thereof and to upper ends of said legs at a lower end portion of said skirt portion so as to support said container on said support member, said skirt portion having an upper opening which is communicated with said upper opening of said upward projection of said bottom wall of said container, said legs being adapted to be placed on a floor in such a manner that said skirt portion is spaced apart from the floor at a predetermined distance; and a tray adapted to be placed on the floor under said skirt portion of said support member in such a manner that said legs are located around said tray, said tray being adapted to receive baits therein;

wherein said skirt portion of said support member has a plurality of ventilation holes formed therethrough around said tray so as to permit flavor from the baits to spread around said flytrap via said ventilation holes;

whereby, when the baits are placed within the tray, flies enter said container via said support member, thereby causing the flies to contact said edible oil and drown in said sterilizing liquid, after which said liquid unit and the flies drowned in said sterilizing liquid can be discharged from said top opening of said container, upon removal of said cap from said container, by inverting said container.

8. A flytrap as claimed in claim 7, wherein said container is made of a transparent material while said support member is made of a translucent material so as to induce the flies to enter said container via said support member.

9. A flytrap as claimed in claim 7, wherein a lower end of said skirt portion of said support member is located at a level slightly over an upper end of said tray so that the flies can easily fly into said tray.

\* \* \* \* \*